United States Patent [19]
Garrett
[11] 3,818,505
[45] June 18, 1974

[54] MAGNETIC TAPE DEVICE WITH FLEXIBLE HEAD MOUNTING AND MOVING MEANS

[76] Inventor: Elmer E. Garrett, Botsford Hill Rd., Roxbury, Conn. 06783

[22] Filed: Aug. 8, 1972
[21] Appl. No.: 278,748

[52] U.S. Cl. .................... 360/101, 35/35 C, 360/60, 360/105, 360/107
[51] Int. Cl. ... G11b 21/14, G11b 23/16, G11b 5/54
[58] Field of Search .... 179/100.2 T; 35/35 C, 35 D, 35/35 A; 274/4 J

[56] References Cited

UNITED STATES PATENTS

| | | | |
|---|---|---|---|
| 2,986,725 | 5/1961 | Dirks | 179/100.2 T |
| 3,291,920 | 12/1966 | Hauser | 179/100.2 T |
| 3,372,242 | 3/1968 | Garrett | 179/100.2 T |
| 3,488,867 | 1/1970 | Lyon et al. | 179/100.2 T |
| 3,521,007 | 7/1970 | Laghaie | 179/100.2 T |
| 3,707,785 | 1/1973 | Reed et al. | 179/100.2 T |

*Primary Examiner*—Bernard Konick
*Assistant Examiner*—Alfred H. Eddleman

[57] ABSTRACT

A magnetic tape device having a magnetic recording and reproducing head carried by a flexible tongue. The tongue is unwound from and wound on a drum while being held against the drum surface by a cord under tension. The drum is rotated by a motor through friction wheels which can be engaged to cause rotation in either direction. A support is provided for aligning message strips with the head and enhancing contact of the magnetic surface with the head. Controls are provided for repeating the reproduction or erasure and recording of any portion of the message at will.

12 Claims, 25 Drawing Figures

MAGNETIC TAPE DEVICE WITH FLEXIBLE HEAD MOUNTING AND MOVING MEANS

This invention relates to devices for recording sounds on magnetic tape, for reproducing the recorded sounds and for displaying visual representations of the recorded sounds.

The broad object of the invention is to provide means for recording and reproducing sound on or from a sound track which is stationary during the recording or reading operation so that the visual representation can be observed in the same manner as printing on the pages of a book.

More specifically, it is the object of the invention to provide a device in which the stationary sound track and visual representation can be made any length which it is convenient for the user to observe without proportionally increasing the total length of the actuating mechanism.

Prior patents have been directed to the objective of reading and recording on a stationary record but have utilized actuating mechanisms having their lengths dependent on the lengths of the stationary sound tracks. U.S. Pat. No. 3,372,242 issued to this inventor, provides for reducing the length of the actuating mechanism by causing a flexible tongue supporting a recording and reproducing head to retract into an arcuate guide. This present invention further reduces the length of the actuating mechanism by causing the flexible tongue to wind spirally upon a supporting drum and to be extended from the drum surface tangentially when the rotation is in the direction to reduce the number of wound turns.

It is well known that the quality of sound reproduced from a magnetic record is dependent upon many factors including the speed with which the recording and reproducing head traverses the record. This makes it desirable to have the record strips of substantial length, such as provided by this invention, so that whole phrases can be included on a single line while, at the same time, making the visual representations of the sound large enough to be fully legible without optical magnification and so that they can be easily prepared by the use of conventional hand held writing devices.

Another well known factor affecting the quality of the sound reproduction is the contact of the recording and reproducing head with the magnetic surface. It has been found that the required uniformity can be achieved by applying the head with uniform pressure against a flexible recording material which in turn rests on a stationary, resilient, backing. A preferred material for this backing is soft rubber tubing.

A still further factor affecting the quality of the sound reproduction is the uniformity of the motion of the recording and reproducing head. It has been found during the development of the invention that this uniformity is enhanced by driving the head with friction wheels, rather than gears, from an electric motor and by mounting the head in a substantial block of material which, due to inertia effects, smooths the movements along the recorded track and which, due to weight, supplies the desired uniform contact pressure.

It has been found that when a flat flexible tongue positioning the recording and reproducing head is extended against the resistance of the head mounting block the tongue may buckle due to the lack of stiffness. When the tongue has a curved cross section the stiffness is greatly increased and buckling under normal conditions encountered in the device is eliminated. It has further been discovered that such a curved tongue made from thin spring material can be wound on and unwound from a drum using the principles disclosed by this invention.

The flexibility of either flat or curved tongues tends to invite unnecessary lifting of the head assembly away from the record strip. In the present invention this is avoided by capturing the assembly on a guide bar which, without interfering with the development of uniform gravitational contact pressure, keeps the head assembly attached to the device and accurately aligned laterally when resting on the magnetic track.

An object of the invention is to make the support for the sound track seperable from the actuating mechanism and, in turn, to make the support separable into two or more components so that the entire device can be compactly packed for storage or for carrying between locations.

A further object of the invention is to provide a simple means for controlling movements of the recording and reproducing head so that any portion of the sound track can be read repeatedly or erased and recorded under full control of the user.

A still further object is to prevent the unintentional erasure of a prerecorded sound track which is intended to be retained, and to permit the erasure and rerecording of a sound track intended for use by a student, teacher or other operator of the device.

A better understanding of the device may be had by reference to the following description of one embodiment thereof taken in conjunction with the following drawings in which.

The electro-magnetic head used for recording and reading sounds on and from magnetic strips is referred to as the pick-up head.

The electro-magnetic head used for erasing sounds from the magnetic strips is referred to as the erase head.

The magnetic strips are also referred to in the description as message strips, lesson strips and practice strips. The latter two categories are important because of expected use of the device for teaching purposes.

The embodiment covered by this description contemplates the use of a conventional alternating current voltage source for operating the power motor of the device and the use of batteries for operating the electronic amplifier. It is obvious that with minor changes the device can be operated entirely from a power line or from batteries. It is also obvious that a spring motor can be used instead of an electric motor.

The embodiment described places the operator control unit at the right with the support tray for message strips projecting to the left. It is obvious that with minor changes the device can be arranged to have the control unit at the left with the support tray projecting to the right.

In the description references to clockwise and counterclockwise rotation are based on the view being from the operator's position or the view from above, unless stated otherwise.

Figure 1:
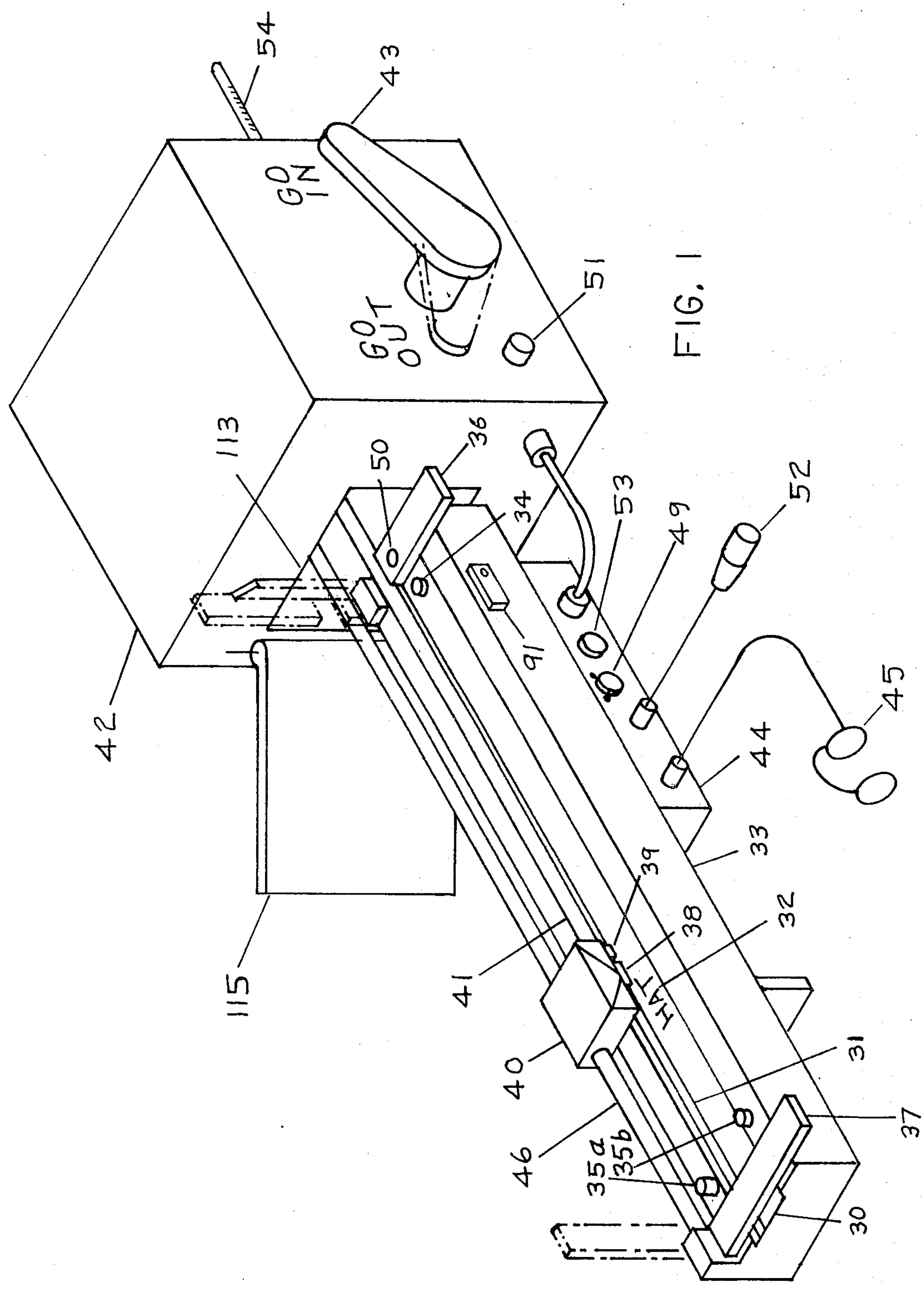
FIG. 1 is a perspective view showing a magnetic tape device embodying the principles of this invention.

Referring to FIG. 1, a message strip 30 containing a magnetic track 31 and delineations 32 corresponding to prerecorded magnetic sounds is mounted on a magnetic strip support 33 by a locating pin 34, by guide pins 35a and 35b and by clamps 36 and 37. A pick-up head 38 and an erase head 39 are both mounted in an index head 40 which is positioned by a flexible tongue 41 extending from a control housing 42. Movement of the flexible tongue is directed by a control lever 43. This is moved by the user between a GO OUT position shown by broken lines and a GO IN position shown by solid lines. Power for the device is supplied by a cord 54 from a conventional power outlet and from internal batteries. Controls, in addition to the control lever 43, consist of an erase/record pushbutton 51, a play-record selector 49 and a volume control 53. An electronic amplifier 44 is shown as a separate package removable from other components of the device. It can also be combined as an integral part of either the magnetic strip support or the control housing.

When the device is energized and the control lever 43 is at the Go Out position the index head 40 travels outward to the extreme left position or to an intermediate position if the control lever 43 is moved earlier to the Go In position. Similarly, when the control lever 43 is at the Go In position the index head 40 travels to the right to the full right position, or to an intermediate position if the control lever 43 is moved earlier to the Go Out position.

No sound results when the selector 49 is set to a position designated as Play and the index head moves to the left. When the head moves to the right, signals developed in the pick-up head 38 are transmitted to the electronic amplifier 44 and to a listening device such as head phones 45. When the index head 40 is entirely within the control housing 42 clamps 36 and 37 can be opened to the positions shown by broken lines and the message strip 30 can be removed and replaced with another strip. A guide bar 46 defines the index head 40 to the magnetic strip support 33 so that it cannot be easily removed.

When the selector 49 is set to a second position designated as Record an interlock prevents the erasure of information from the message strip 30 or the recording of new information. However, the message strip 30 can be replaced by a practice strip 55 as explained in connection with FIG. 5 and both erasure and recording can be accomplished.

When the index head 40 is within the control housing 42 the magnetric strip support 33 can be removed from the housing. The opening 113 can then be closed by door 115.

Figures 2, 3, 4, 5:
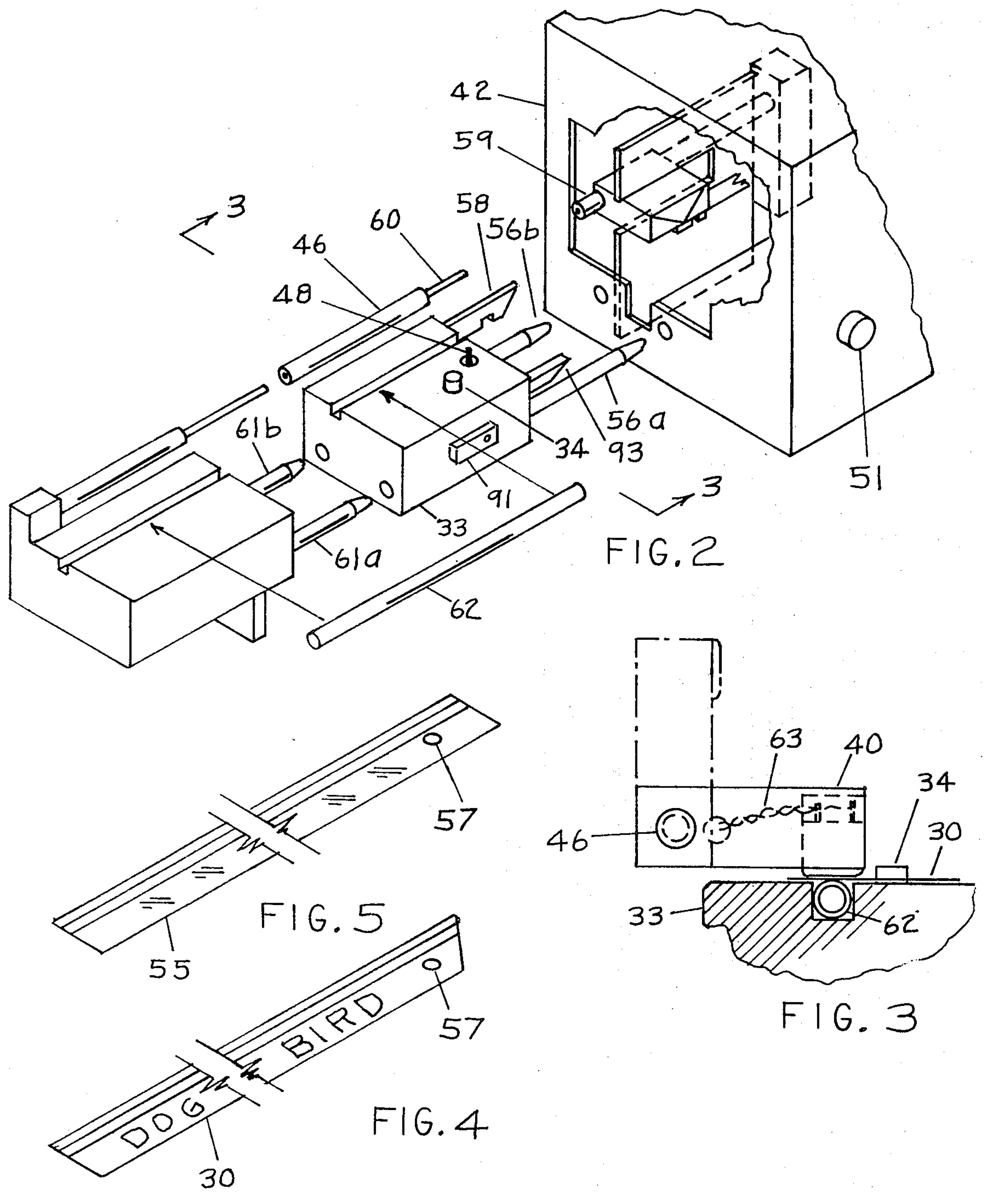
FIG. 2 is an exploded perspective view showing the method of connecting the separable components of the device.
FIG. 3 is a sectional view taken on line 3—3 of FIG. 2.
FIG. 4 is a perspective view of a typical magnetic strip with pre-recorded message.
FIG. 5 is a perspective view of a typical magnetic strip for practice recording by the user of the device.

Referring to FIG. 2, the magnetic strip support 33 is mounted on the control housing 42 by dowels **56*a* and 56*b* and is held in position by a latch 58. The guide bar 46 is aligned with a guide bar 59 of the control housing 42 by a locating pin 60. An interlock pin 48 in conjunction with an arm 93, which engages a lever within the control housing 42, protects against the unintentional erasure of recordings which are intended to be retained. The magnetic strip support 33 can be divided into two or more sections connected by two dowels 61*a* and 61*b*, or other locating means. A flexible backing strip 62 is supplied as a single piece extending over the two or more sections of the support. It is mounted in a channel formed in the top surface of the support as shown by FIG. 3. Flexible material such as soft rubber tubing is preferred for this backing. Also as shown by FIG. 3, the entire index head 40 can be lifted away from the message strip 30 by rotating it on the guide bar 46** toward the vertical position. This permits inspection and cleaning of the heads. Circuits to the pickup and erase heads are provided by a cable 63 extending loosely from the index head 40 to the control housing 42.

FIG. 4 is an illustration of the message strip 30. The strip can be made from commercial magnetically striped 35 millimeter editing film. Other types and widths of materials can also be used. When the body of the film is transparent the surface of the support may be made light in color so that printing or hand markings on the film are easy to see. The right end of the message strip 30 contains a hole 57 for the locating pin 34 shown on FIG. 2. The same end is cut at an acute angle, or otherwise shaped, to clear the interlock pin 48, also shown on FIG. 2, which then can project upward past the magnetic strip into a hole 50 of the clamp 36 shown on FIG. 1. This allows the erasing and recording circuitry to remain in the normal inoperative mode.

FIg. 5 is an illustration of a practice strip 55 which can be substituted for the message strip 30. This practice strip is similar to the message strip except that the right end is cut at a 90° angle to cover the interlock pin 48. Pressure from clamp 36, shown on FIG. 1, then keeps the end of the interlock pin flush with the support surface and thereby enables the erasing and recording circuitry to operate. With the selector 49 shown in FIG. 1 set to Play any signal previously recorded on the practice strip is reproduced. With the selector 49 set to Record and with the erase/record pushbutton, also shown on FIG. 1, depressed any section of the practice strip being traversed is erased and can be recorded on by speaking into a microphone 52 shown on FIG. 1.

Figure 6:
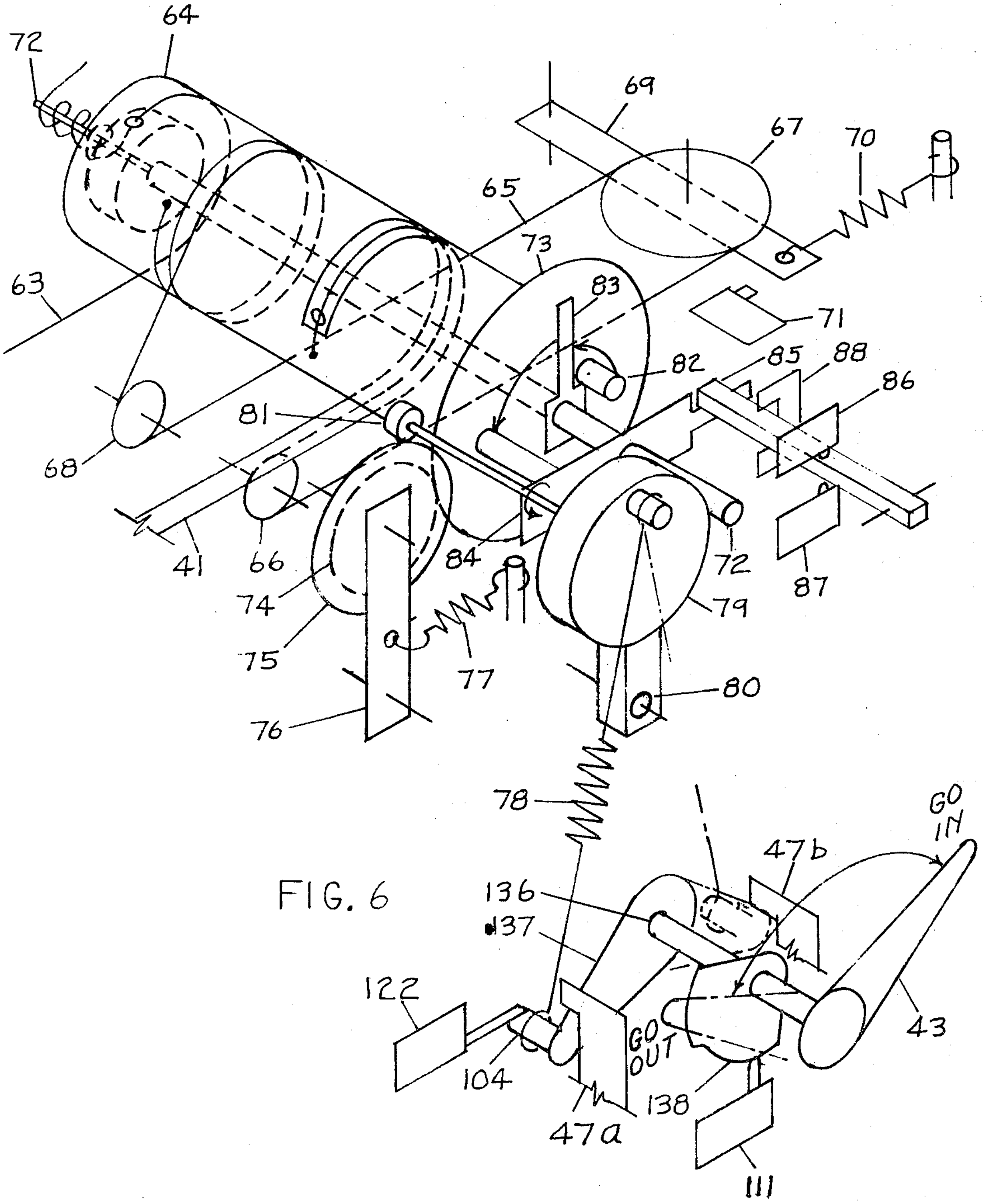
FIG. 6 is a schematic perspective view showing the elements of the mechanism for controlling the movements of the flexible tongue of the device.

The flexible tongue 41 is attached to a drum 64 as shown by FIG. 6. A cord 65 is also attached to the drum and wraps on each turn of the flexible tongue. The cord extends around a pulley 66 to a movable pulley 67, then around a pulley 68 and back to the drum surface in the direction of wrap opposite to the direction of the tongue wrap. It makes several turns before being attached to the drum surface. The pulley 67 is supported on an arm 69. A spring 70 attached to the arm holds the cord taut. Counterclockwise rotation of the drum 64 wraps up the flexible tongue and a corresponding length of cord from the storage turns. A mismatch of the amount of cord unwrapped with the amount wrapped against the flexible tongue is compensated for by movement of the arm 69.

Clockwise rotation of the drum 64 unwraps the flexible tongue and the free end moves tangentially from the surface to the magnetic strip support. Tension from the cord 65 holds the wrapped portion of the tongue against the drum surface. This provides enough outward thrust to move the index head 40 along the magnetic strip support 33 and the guide bar 46 shown on FIG. 1. If any abnormal resistance is encountered and the head does not move outward in proportion to the drum rotation, the flexible tongue 41 lifts from the drum surface and cord is not released to the tension loop between pulleys 66 and 68. Continuing removal of cord from the tension loop by rewrapping on the drum surface beyond the pulley 68 then causes the arm 69 to rotate clockwise. A switch 71 is then operated by the arm deenergizing a driving motor 79 provided for rotating the drum. The control lever 43 can then be moved to the Go In position to return the index head 40 to the control housing 42.

The cable 63 carrying the electrical circuits from the index head 40 to the drum 64 makes several turns counterclockwise around the drum and then passes radially into the hollow center. There it makes several turns, loosely, around a small diameter portion of a fixed shaft 72 and is finally attached to a point within the control housing. As the drum rotates, the outer turns are payed out or increased and the inner turns are also decreased or increased (depending on the initial direction of the wrap). The inner turns then become larger or smaller in effective diameter and so permit the drum to rotate without there being any need for changing the length of the cable 63.

Referring further to FIG. 6, a friction wheel 73 mounted on the drum 64 is rotated in the counterclockwise direction by another friction wheel 74. The friction wheel 74 is attached to an additional friction wheel 75 and both are carried by a yoke 76. Contact between friction wheels 73 and 74 is maintained by a spring 77 attached to the yoke. When the control lever 43 is at the Go In position a spring 78 rocks the motor 79 counterclockwise on a pivot shaft 80 until a friction wheel 81 mounted on the motor shaft contacts the friction wheel 75. The motor 79 when energized always runs in the counterclockwise direction. As a result, the friction wheel 75 and its companion, the friction wheel 74, run clockwise. The drum then is rotated counterclockwise by the friction wheel 73 as required for retracting the tongue. In a similar way, when the control lever 43 is at the Go Out position spring 78 rocks the motor 79 clockwise until the friction wheel 81 contacts friction wheel 73. This then causes the drum to rotate clockwise thus extending the flexible tongue 41.

Continuing the reference to FIG. 6, a stop for limiting the outward and the inward travel of the flexible tongue 41 is provided by a pin 82 projecting from the end of the drum 64 parallel to the axis and arranged to act against an intermediate arm 83 which in turn acts against a stop arm 84 and through it a switch arm 85. The total rotational freedom provided by this arrangement amounts to about 2½ turns. In a typical design with a control housing 10 inches long this provides an index head travel of about 27 inches. A reading speed of about 2 inches per second has been found suitable. Following conventional design practices additional rotational freedom for greater index head travel can be provided by adding additional intermediate arms. At the limit of counterclockwise rotation the stop arm 84 engages the bottom of the switch arm 85 and a switch 86 is operated, deenergizing the motor 79. At the limit of clockwise rotation the stop arm 84 engages the top of the switch arm 85 and a switch 87 is operated, again deenergizing the motor. Because of inertia effects the rotation of the drum 64 tends to continue a small amount until the switch arm 85 engages a positive stop 88. The inertia effects are most pronounced on the outward stroke because of the greater speed resulting from the direct engagement of the friction wheel 81 with the friction wheel 73. This increased speed, which is desirable, reduces the time required for the non-reading part of each stroke. In the typical design it is about 6 inches per second.

Referring still further to FIG. 6, the control lever 43 is mounted on a shaft 136 which also supports a cam 138 and a crank 137. The cam 138 actuates a directional switch 111 which operates in conjunction with the limit switches 86 and 87 to permit movement of the drum 64 away from the limit stop position. A stop 47*a* prevents clockwise rotation of the control lever 43 beyond the Go In position. Likewise a stop 47b prevents counterclockwise rotation of the control lever 43 beyond the Go Out position. The crank 137 supports a pin 104 to which one end of the spring 78 is attached. After the control lever 43 is moved from either position against the tension of the spring 78 past dead center it tends to rotate naturally to the other position against whatever restraint is provided by the operator. The pin 104 also actuates a switch 122 of the amplifier circuit when the control lever 43 is at the Go In position. The purpose of the switch 122 is to prevent extraneous sounds at the moment of the index head 40 reversal.

Figures 7, 8:
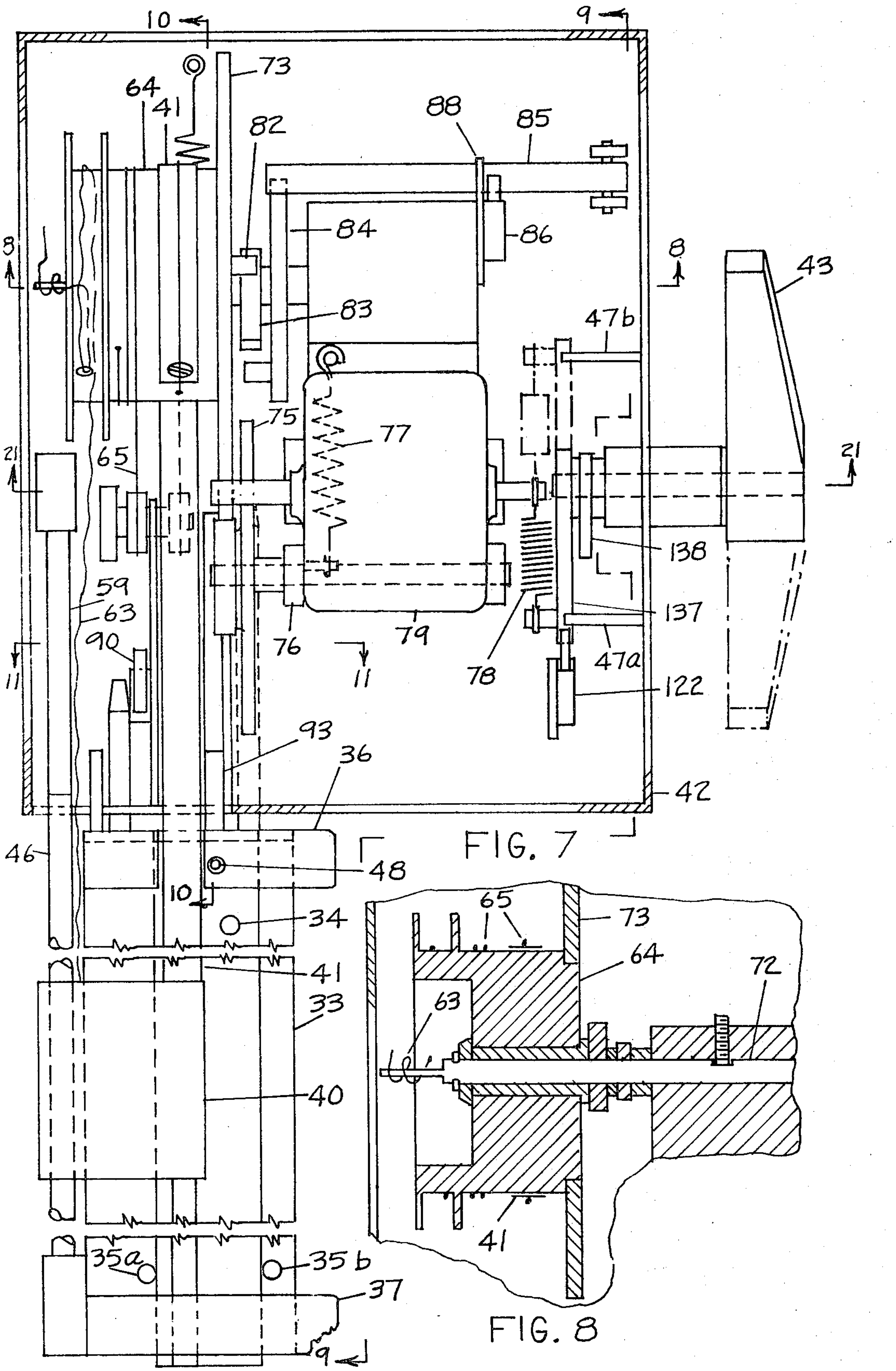
FIG. 7 is a plan view of the device with the top of the enclosure removed.
FIG. 8 is a partial sectional view taken on line 8—8 of FIG. 7.
Figure 9:
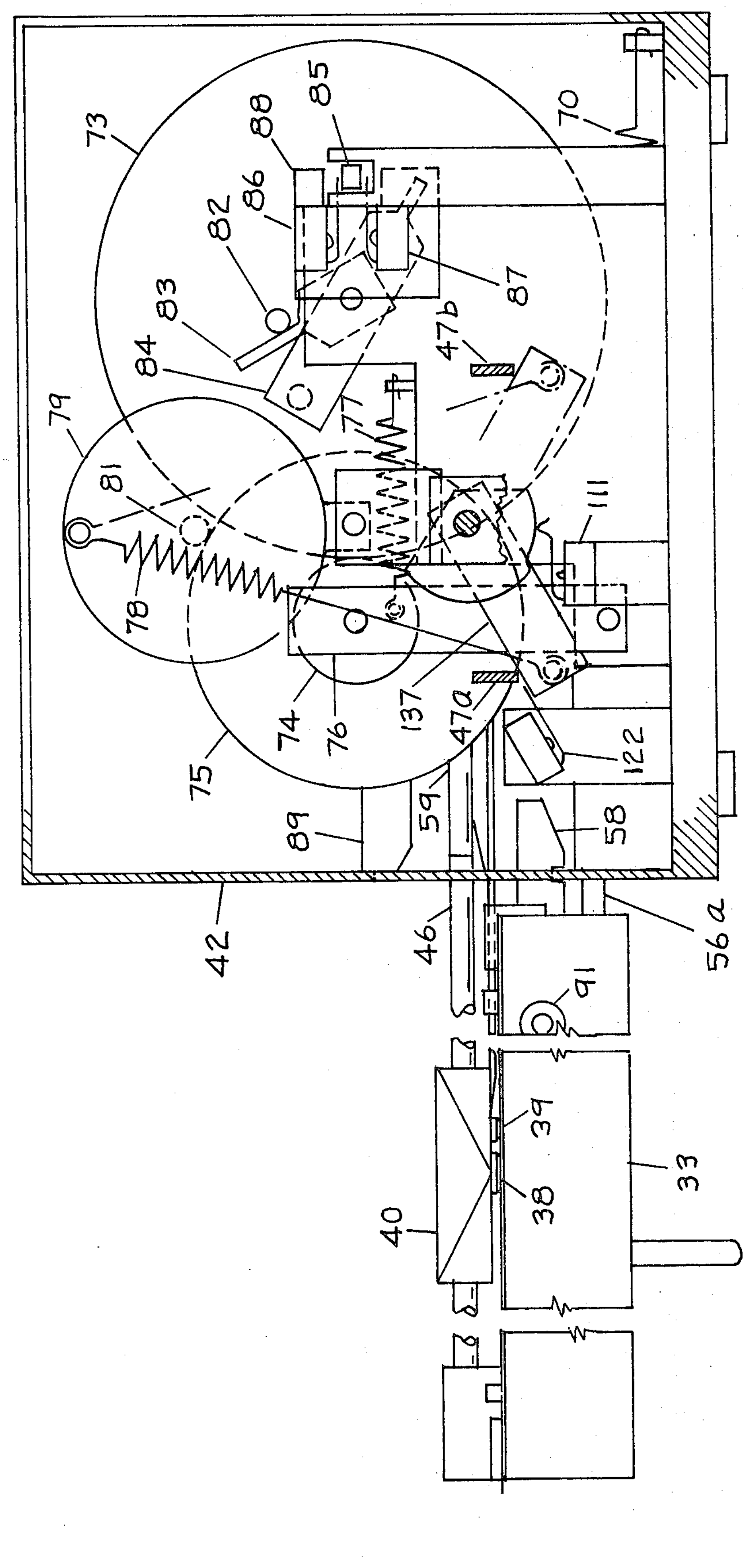
FIG. 9 is a sectional view taken on line 9—9 of FIG. 7.

FIGS. 7, 8 and 9 further show the locations and configurations of the preceding components of the device.

Figure 10:
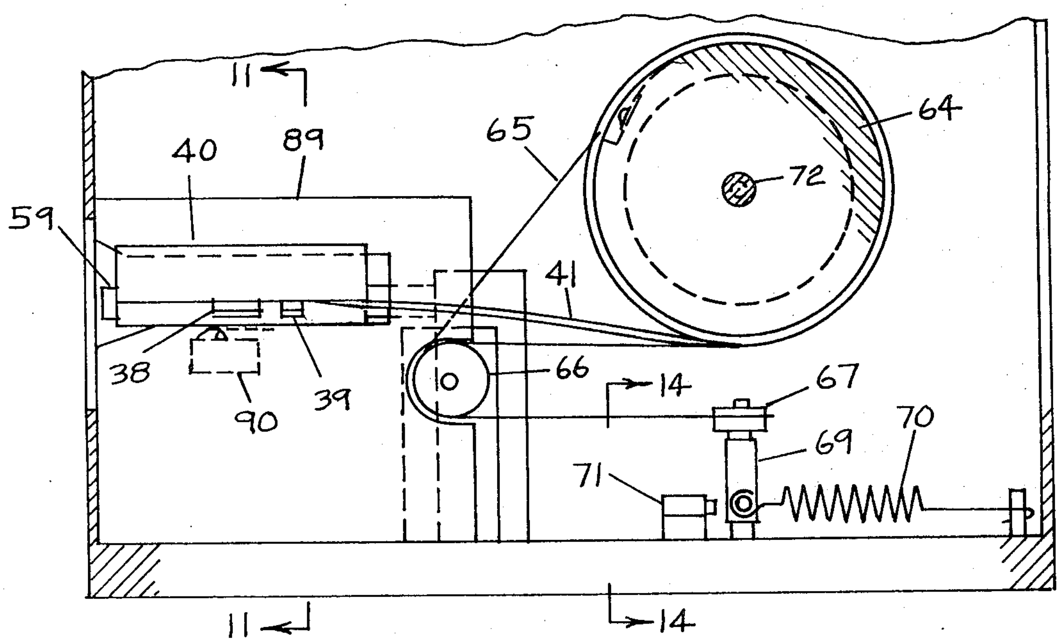
FIG. 10 is a partial sectional view taken on line 10—10 of FIG. 7 with the flexible tongue in the fully retracted position and with the support for the magnetic strip removed.
Figure 11:
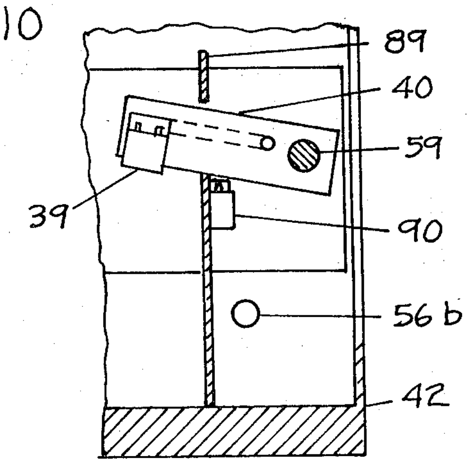
FIG. 11 is a partial sectional view taken on line 11—11 of FIG. 7.

FIGS. 10 and 11 show the arrangement for retaining the index head 40 within the control housing 42. As the index head 40 enters the control housing 42 toward the fully retracted position, while sliding on the guide bar 59, it enters a slot in the guide plate 89 and is lifted from the lesson strip. The upper surface of the slot prevents excessive movements of the index head 40 when the device is being transported. A switch 90 deenergizes the amplifier when the index head 40 is at this "home" position.

Figure 12:
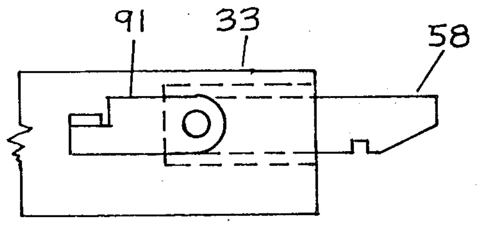
FIG. 12 is a partial sectional view showing the magnetic strip support locking device partly illustrated on FIG. 2.

The latch 58 attaching the magnetic strip support 33 to the control housing 42 is shown in more detail by FIG. 12. To remove the support, the latch is released by finger pressure on a lever 91 located at the front of the support.

Figures 13, 14:
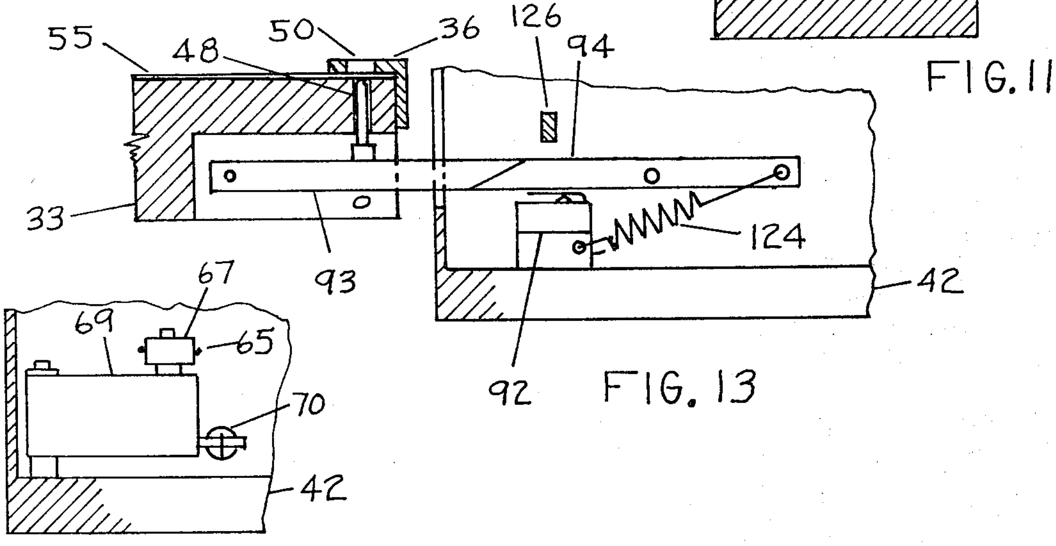
FIG. 13 is a partial view showing the erasure protective device partly illustrated on FIG. 2.
FIG. 14 is a partial sectional view taken on line 14—14 of FIG. 10.
Figure 15:
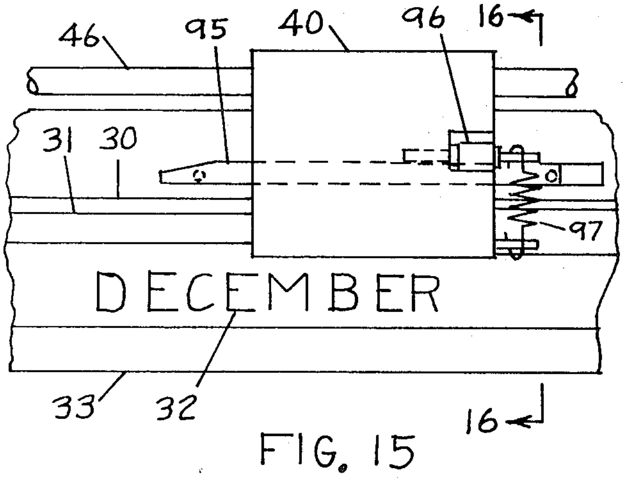
FIG. 15 is a partial plan view of the magnetic strip support shown on FIG. 7 illustrating an additional, optional, feature.
Figure 16:
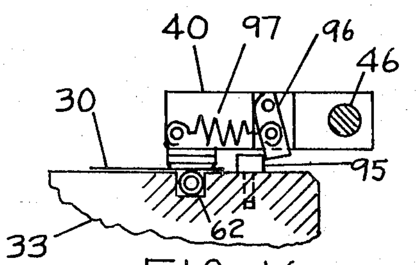
FIG. 16 is a sectional view taken on line 16—16 of FIG. 15 with the pick-up head in contact with the magnetic surface.
Figure 17:
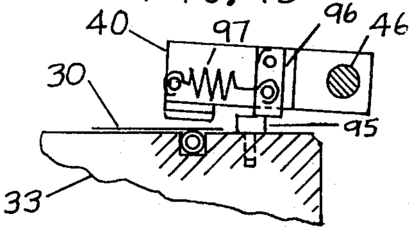
FIG. 17 is a sectional view taken on line 16—16 of FIG. 15 with the pick-up head raised from contact with the magnetic strip.

FIG. 13 shows the interlock provided to prevent unintentional erasure of lesson strips and to permit the erasure of practice strips. Lesson strips have the right ends cut at an acute angle to clear the interlock pin 48 as previously explained in connection with FIG. 4. This allows the arm 93 and a lever 94 which it engages to be moved by a spring 124 against a stop 126 thus releasing pressure on a switch 92 are required for deactivating the erase circuit. Practice strips 55 have the right ends cut at a 90° angle to cover the interlock pin 48 as previously explained in connection with FIG. 5. As a result, the arm 93 and the lever 94 are depressed when a practice strip is mounted on the magnetic strip support and secured by the clamp 36. The lever 94 then operates the switch 92 and thereby activates the erase circuitry. Any practice strip can be converted to a lesson strip by removing material to clear the interlock pin 48. Practice strips can be mounted on the magnetic strip support 33 without removing the preceding lesson strip. When using transparent practice strips the delineations on the lesson strips can be easily seen and therefore do not need to be copied unless preferred by the user.

FIG. 14 shows the arrangement of the arm 69 supporting pulley 67 which, by the action of the spring 70 provides tension in the cord 65.

FIGS. 15, 16, 17 and 18 show an optional feature of the device which can be used to prevent sound from being reproduced from partial words when the control lever 43 is moved from the Go Out position to the Go In position before the index head 40 has reached the left limit of travel. The length of the magnetic strip support 33 is considered to consist of a series of blocks with each block being reserved for a single word. Usually the blocks are of equal length but they can also be of various lengths. The surface of the support is supplied with a series of cams similar to a cam 95, one for each block. The right end of each cam is shaped as a ramp. The left end of each cam is shaped as a half plow. As the index head 40 is moved outward between words (and between the corresponding cams) a lever 96, which is held erect by spring 97, rides up on the ramp of each cam and the index head 40 is held away from the magnetic surface until the left end of the cam is reached. If the index head 40 motion is reversed while it is being held up in this way no sound is reproduced. Subsequently as the stroke to the right proceeds the lever 96 rides down the ramp and the index head 40 resumes contact with the magnetic surface. When the next cam to the right is reached the lever 96 strikes the plow shaped end and is diverted laterally so that the index head remains in contact with the magnetic surface. The sound for the word recorded in this block is then reproduced. The same action is repeated as the index head 40 moves through the following blocks to the right end of the magnetic strip 30.

Figure 18:
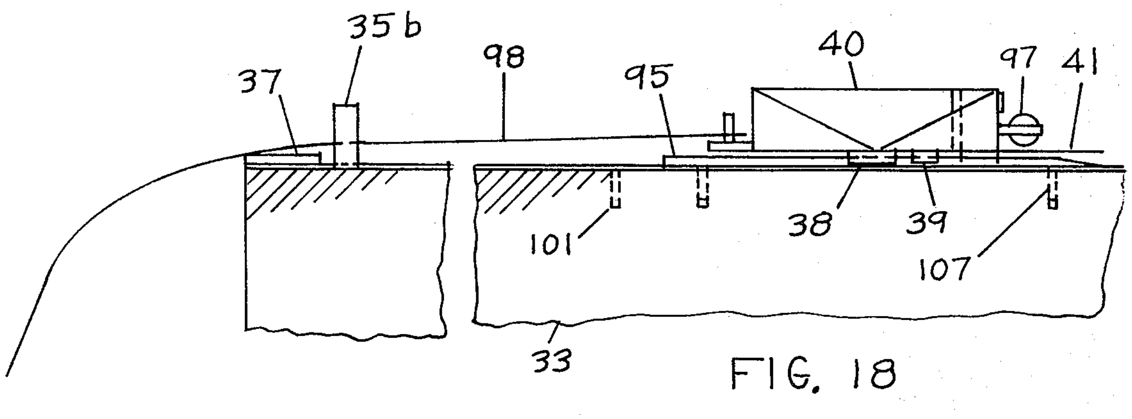
FIG. 18 is a partial elevation view of the magnetic strip support showing an additional, optional, feature.

Referring further to FIG. 18, the cams 95 are attached to the magnetic strip support 33 by two projections 107 which fit into selected holes from a series of uniformly spaced holes 101 provided in the surface of the support. The cams 95 can be made longer or shorter in multiples of this hole spacing to provide for longer or shorter words. Also they can be positioned along the surface to suit various combinations of word positions on the message strips 30. The lever 96 can be arranged to operate a switch which short circuits the pick-up head terminals, to prevent the reproduction of sound, instead of lifting the head from the magnetic surface.

An additional optional feature is also shown on FIG. 18. This consists of an opaque curtain 98 which travels with the index head. The effect is to block the user's view of past words, forcing concentration on words ahead.

Figures 19, 20:
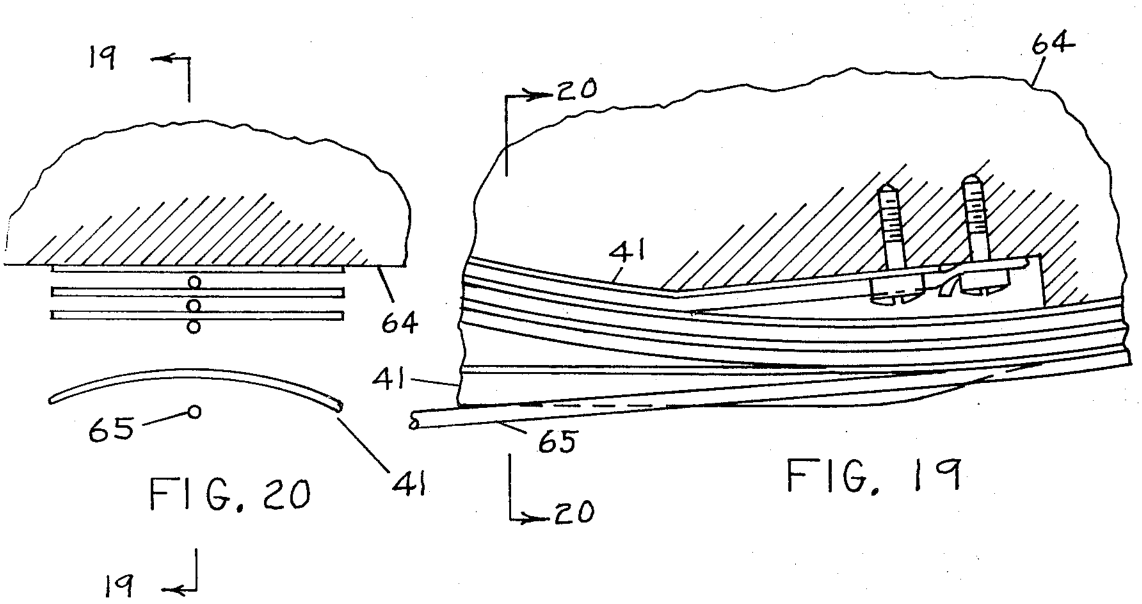
FIG. 19 is an enlarged sectional view showing the attachment of the flexible tongue to the drum.
FIG. 20 is a sectional view taken on line 20—20 of FIG. 19.

FIG. 19 illustrates the wrapping of the flexible tongue 41 on the drum 64 and the attachment of the end opposite the free end to the drum surface. Tongues made from laterally curved spring material as shown by FIG. 10 are preferred because the axial stiffness is much greater than that of flat spring material of the same thickness. This increases the outward force which can be exerted on the index head 40. Also, because of the curvature, the tongue arches over the magnetic tracks on the lesson and practice strips eliminating wear which might otherwise occur. Under the action of the cord 65 the lateral curvature disappears as the tongue is wrapped on the drum surface. This allows the wrapping to proceed smoothly with each turn being separated from the preceding turn by the cord thickness. The slight build-up of effective drum diameter as the wrapping proceeds slightly affects the speed of the index head 40. Since the build-up is repetitive from stroke to stroke the speed variation is of no consequence when the pre-recording is done on the same type of device or when it is done on any other equipment having a similar speed characteristic. For special applications requiring uniform index head speed an additional mechanism can be provided for winding the flexible tongue 41 helically around the surface of the drum 64, instead of spirally.

Figures 21, 22:
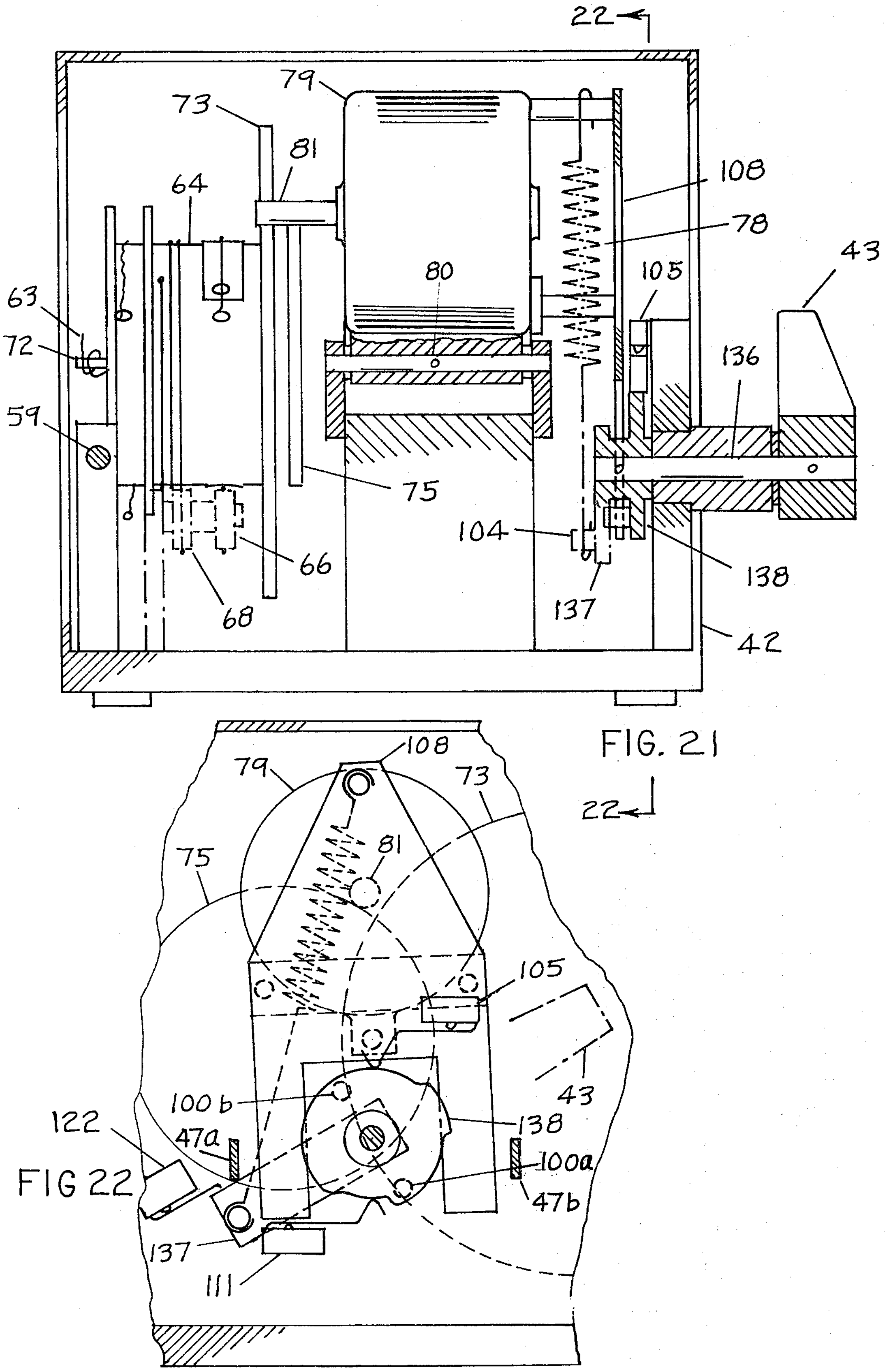
FIG. 21 is a partial sectional view taken on line 21—21 of FIG. 7 and showing an additional, optional, feature.
FIG. 22 is a partial sectional view taken on line 22—22 of FIG. 21.
Figure 23:
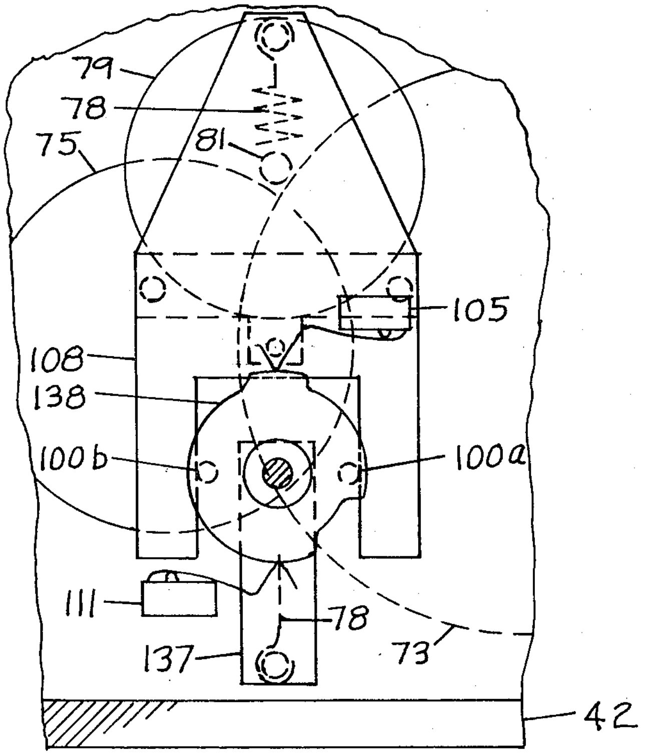
FIG. 23 is a partial sectional view taken on the same line as FIG. 22 and showing the mechanism in a different position.

FIGS. 21, 22 and 23 show an additional, optional, feature of the device which causes the index head 40 to stop moving when the control lever 43 is moved to its dead center position midway between the Go Out and the Go In positions. The purpose of this is to allow the user time to consider the significance of a recorded message before it is repeated. After such a pause, the motion of the index head 40 in either direction can be resumed by allowing, or slightly helping, the control lever 43 to move to either the Go Out or the Go In position under the influence of spring 78. The device consists of a cam plate 108 mounted on the frame of the motor 79 and pins 100*a* and 100*b* mounted on the cam 138. When the control lever 43 is moved to dead center the pins 100*a* and 100*b* center the cam plate 108 so that the friction wheel 81 is out of contact with either the friction wheel 73 or the friction wheel 75 with which it usually mates. Movement of the index head 40 then stops. To eliminate slight but possibly distracting sound from the motor 79 during the pause it is deenergized by a switch 105 which is operated by a projection on the cam 138. Deenergizing the motor, alone, for stopping the movement of the index head 40 is not satisfactory because of inertia effects.

Figure 24:
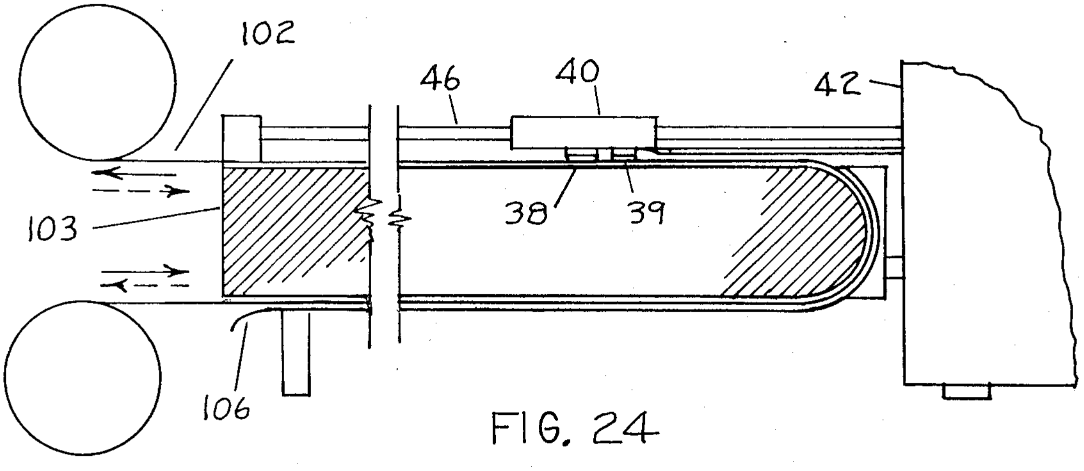
FIG. 24 is a schematic elevation view of the magnetic strip support showing an alternate arrangement for using continuous magnetic film instead of discrete message strips.

A further optional arrangement of the device is shown schematically by FIG. 24. In this, discrete lesson strips are replaced by a film 102 containing a series of individual lesson sections. The film is directed around a support 103 by a guide 106. It can be advanced from section to section by directly pulling the film, by manually rotating a take-up reel or by manually rotating pull rolls or sprocket wheels. Also these feeding devices can be motor operated to permit push button control by the user, a handicapped user for example.

Figure 25:
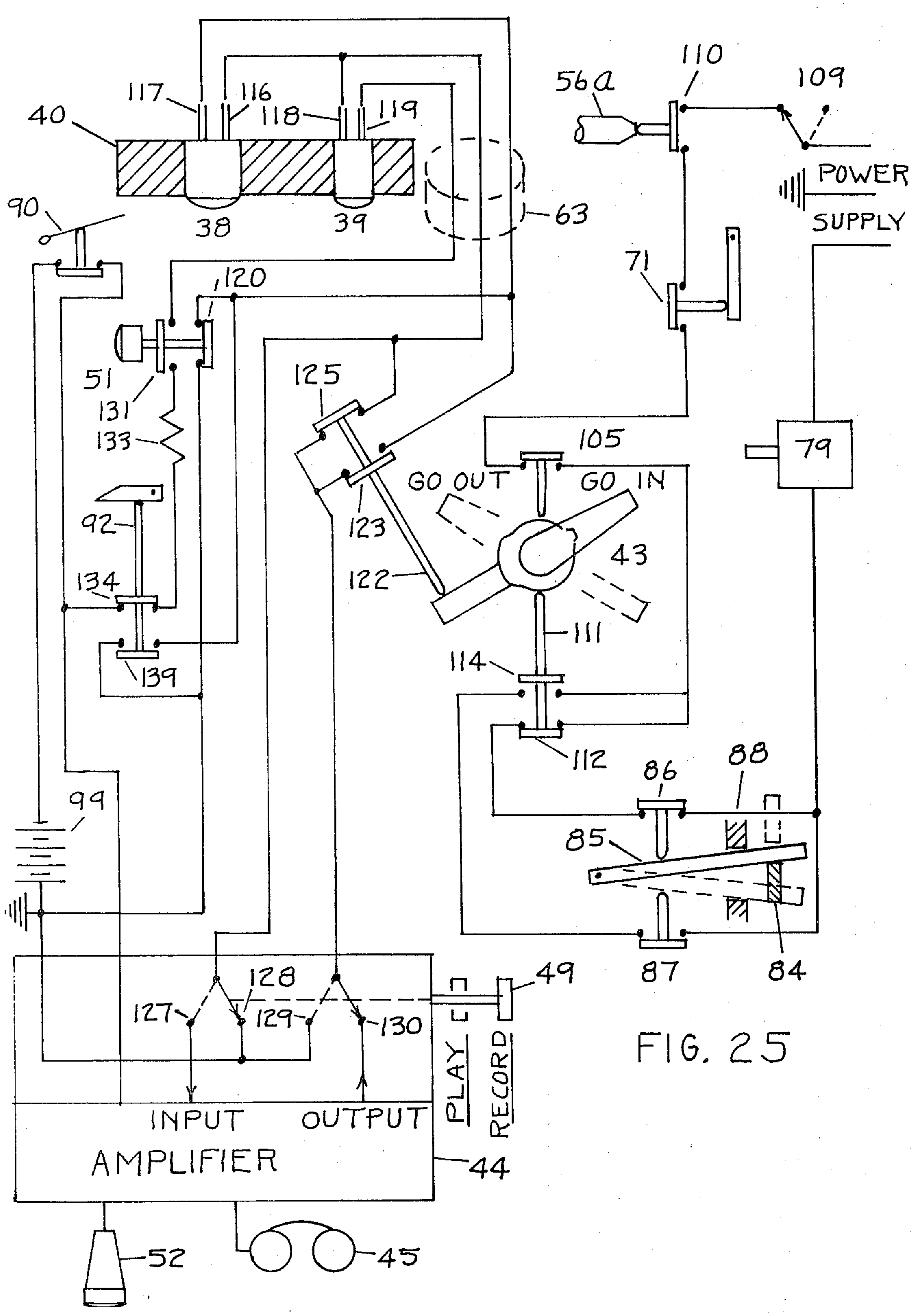
FIG. 25 is a wiring diagram showing control circuits for the sound recording and reproducing system and the control circuits for the flexible tongue positioning motor.

The wiring schematic for the device is provided by FIG. 25. This consists of two systems. A low voltage electronic circuit for sound recording and reproduction and a line voltage circuit for energizing the motor 79. A battery 99 is used for the low voltage source and a conventional alternating current outlet is used for the line voltage source.

In the line voltage circuit power flows to the motor 79 through an on-off switch 109, the dead center switch 105, a switch 110 for confirming that the magnetic strip support 33 is mounted on the control housing 42, the overload switch 71, the direction switch 111 and the limit switches 86 and 87. The motor 79 cannot be operated unless the switch 110 is closed by pressure from dowel 56*a.* Usually, when the device is "standing by" with the power turned on, the switches 105 and 71 are closed and the motor is kept deenergized by the combination of the directional switch 111 acting in conjunction with the limit switches 86 and 87. More specifically, when the index head 40 is fully retracted and the control lever 43 is at the Go In position the circuit to the motor 79 through the limit switch 87 is opened by a contact 114 of the switch 111; also the circuit to the motor 79 through a contact 112 of the switch 111 is opened by the limit switch 86. When the control lever 43 is moved to the Go Out position the contact 114 is closed and the motor runs until the limit switch 87 is opened at the outer limit. The action on a subsequent inward stroke is similar. The operation of the switch 71 has previously been explained in connection with FIG. 6. Likewise, the operation of the switch 105 has been explained in connection with FIGS. 21, 22 and 23.

In the low voltage electronic circuit power flows from the source to the switch 90. This switch is open when the index head 40 is at the fully retracted position. It is closed when the head moves outward in response to movement of the control lever 43. The switch 92 is operated when the presence of a practice strip is detected by the interlock pin 48 as described in connection with FIG. 13. The erase/record pushbutton 51 provides for simultaneously erasing and recording any portion of a practice lesson when it is depressed. The switch 122 has the effect of connecting the pick-up head 38 to the amplifier only when the control lever 43 is at the full Go In position. The selector switch 49 of the electronic amplifier 44 makes the input and output connections of the amplifier available for connection to the pick-up head 38 by the rest of the circuit.

When a practice strip is mounted on the magnetic strip support 33 and the index head 40 is at the left end of the support positioning the selector switch 49 at the Record position and moving the control lever 43 to the Go In position connects the output of the electronic amplifier 44 through a contact 130 of the selector switch 49 in series with a contact 123 of the switch 122 to a terminal 117 of the pick-up head 38. A contact 128 of the selector switch 49 also connects the amplifier common, ground, circuit to a terminal 116 of the pick-up head 38. A contact 120 of the erase/record pushbutton 51 further connects the terminal 117 to ground thus short circuiting both the pick-up head and the amplifier. Depressing the erase/record pushbutton 51 opens the contact 120, removing the short circuit and allowing recording by speaking into the microphone 52 to proceed. A subsequent movement of the control lever 43 to the Go Out position connects the amplifier output from the contact 130 of the selector switch 49 through a contact 125 of the switch 122 to the amplifier ground through the contact 128 of the selector switch 49. This grounds the amplifier output so that no signals are transmitted to the pick-up head 38. In addition, the terminal 117 of the pick-up head 38 is grounded by the contact 120 of the erase/record pushbutton 51. This records the possibility of extraneous sounds being recorded due to capacitive and inductive effects.

Depressing the erase/record pushbutton 51 in addition to opening the contact 120 closes a contact 131 and thereby makes a circuit from the switch 90 through a contact 134 of the switch 92 and through a resistor 133 to a terminal 119 of the erase head 39. The terminal 116 of the pick-up head 38 is connected to the common, ground, circuit by the contact 128 of the selector switch 49 as just described. Also the terminal 116 is connected to a terminal 118 of the erase head 39. As a result current flows through the erase head as required for the erasing function. Usually it is sufficient to accomplish the erasing simultaneously with the recording on the inward stroke. However it can also be performed on the outward stroke.

Continuing with a practice strip mounted on the magnetic strip support 33 and with the index head 40 at the left end of the support, positioning the selector switch 49 at the Play position and moving the control lever 43 to the Go In position connects the amplifier input through a contact 127 of the selector switch 49 to the terminal 116 of the pickup head 38. A contact 129 of the selector switch 49 connects the amplifier common, ground, circuit to the terminal 117 of the pick-up head 38 through the contact 123 of the switch 122. Sound is then reproduced during the inward movement of the index head 40. The terminal 117 of the pick-up head 38 is also connected to the common, ground, circuit by the contact 120 of the erase/record pushbutton 51. This is a redundant connection in the Play mode and the operation is not affected if the erase/record pushbutton 51 is depressed.

Following the reading stroke just described, movement of the control lever 43 to the Go Out position closes the contact 125 of the switch 122 and the resulting circuit from the amplifier common, ground, through the contacts 129 and 127 of the selector switch 49 grounds the amplifier input and no sound is reproduced. As in the Record mode, the pick-up head is also short circuited during the outward movement of the index head 40 by the connection to ground from the terminal 117 through the contact 120 of the erase/record pushbutton 51.

Operation with a lesson strip mounted on the magnetic strip support 33 is similar except that the erase/record pushbutton 51 is made ineffective by the contacts of the switch 92. This switch is in the released position when a lesson strip is mounted on the magnetic strip support 33, as previously described. A contact 139 of the switch 92 shorts out the contact 120 of the erase/record pushbutton 51 and the contact 134 of the switch 92 opens up the power supply from the switch 90. Therefore, since the amplifier remains short circuited and the erase circuit remains deenergized when the erase/record pushbutton 51 is depressed, neither recording or erasure can take place during an inward movement of the index head 40 in the Record mode.

What is claimed is:

1. A magnetic tape device comprising a generally cylindrical drum rotatable about its axis, a support for supporting said drum on its axis, a flexible tongue fastened at one end to the surface of the drum and free at the other end in such manner that the tongue may be wrapped on and unwrapped from the drum as the latter is rotated, a pick-up head affixed to the free end of said flexible tongue, a cord attached to the surface of said drum and wrapped outside of each turn of said flexible tongue, means for tensioning said cord and compensating for the length of cord wrapped on and unwrapped from the drum surface during rotation, and means for rotating said drum.

2. A device according to claim 1 including a message strip support arranged to extend along a line, in a plane perpendicular to the drum axis, taken by the pick-up head as the tongue unwinds and winds on said drum, means associated with said message strip support to keep said message strip positioned along said lines, means to keep said head positioned along said line and in contact with said message strip, and means on said message strip support to enhance the contact between said pick-up head and said message strip.

3. A device according to claim 1 including means to stop rotation of said drum in the event that the outward movement of the flexible tongue is blocked.

4. A device according to claim 1 including means for rotating the drum in either direction by friction drive wheels from a motor running in one direction, one direction of rotation of the drum being obtained by use of an odd number of wheel engagements and the other by use of an even number of wheel engagements, and the selection of the number of wheel engagements being determined by rotating the motor frame on a mounting axis parallel to and displaced from the axis of the motor shaft.

5. A device according to claim 4, including means for rotating the frame of the motor about the mounting axis, said means comprising a tension spring attached at one end to the motor frame and extending toward and beyond the mounting axis and attached at the other end to a crank having its axis parallel to the mounting axis and displaced from that axis, and stops to limit the rotation of said crank.

6. A device according to claim 4, including means for rotating the motor frame about the mounting axis to a position where the motor shaft is disengaged from either of the mating friction wheels, and means for holding the motor in the said position.

7. A device according to claim 2, including means for holding the pick-up head out of contact with predesignated sections of the magnetic strip during travel in one direction and during travel in either direction over any section being traversed at the point of reversal.

8. A device according to claim 2, including means for short circuiting the terminals of the pick-up head during travel over predesignated sections of the magnetic strip in one direction and during travel in either direction over any section being traversed at the point of reversal.

9. A device according to claim 2, including means for dismounting the message strip support and means for retaining the pick-up head adjacent to the drum when the message strip support is dismounted.

10. A device according to claim 1 in which the tongue comprises thin spring material which has a natural curved cross section when free and a substantially straight cross section when wrapped on a cylinder and held against the surface of the cylinder by a cord or tape under tension.

11. A device according to claim 2, including guides for feeding the message strip from a reel or other storage arrangement to one end of the message strip support and thence along the line taken by the pick-up head, as the flexible tongue unwinds and winds on the drum, to a pulling arrangement which may also reel or otherwise store the message strip.

12. A device according to claim 2, including means for sensing the presence or absence of material in a predesignated area of the message strip, said means being arranged to prohibit or to permit recording and erasing of magnetic data on the message strip.

* * * * *